United States Patent [19]

Monnier

[11] Patent Number: 5,709,189

[45] Date of Patent: Jan. 20, 1998

[54] CONTROLLED-IGNITION DIRECT FUEL INJECTION FOUR-CYCLE INTERNAL COMBUSTION ENGINE

[75] Inventor: Gaétan Monnier, Rueil-Malmaison, France

[73] Assignee: Institut Francais du Petrole, Rueil Malmaison, France

[21] Appl. No.: 728,195

[22] Filed: Oct. 10, 1996

[30] Foreign Application Priority Data

Oct. 13, 1995 [FR] France .................. 95 12263

[51] Int. Cl.[6] ........................... F02B 19/00
[52] U.S. Cl. ........................... 123/260
[58] Field of Search ............ 123/260, 432, 123/308, 253, 287, 293

[56] References Cited

U.S. PATENT DOCUMENTS

| | | | |
|---|---|---|---|
| 4,127,089 | 11/1978 | Tsutsumi | 123/260 |
| 4,214,559 | 7/1980 | Hatanaka et al. | 123/293 |
| 4,216,748 | 8/1980 | Ichida | 123/353 |
| 4,267,806 | 5/1981 | Kanda et al. | 123/287 |
| 4,329,955 | 5/1982 | Muranaka et al. | 123/260 |
| 4,594,976 | 6/1986 | Gonzalez | 123/260 |
| 4,679,532 | 7/1987 | Aoi et al. | 123/90.22 |
| 5,042,443 | 8/1991 | Romanelli | 123/315 |

FOREIGN PATENT DOCUMENTS

| | | | |
|---|---|---|---|
| 0412008 | 2/1991 | European Pat. Off. | 123/260 |
| 0483109 | 4/1992 | European Pat. Off. | 123/260 |
| 0676540 | 10/1995 | European Pat. Off. | 123/260 |
| 814385 | 7/1937 | France | 123/260 |
| 20 39 462 | 2/1972 | Germany | 123/260 |
| 2233390 | 1/1991 | United Kingdom | 123/260 |

*Primary Examiner*—Raymond A. Nelli
*Attorney, Agent, or Firm*—Antonelli, Terry, Stout, & Kraus

[57] ABSTRACT

The present invention relates to a controlled-ignition direct fuel injection, four-cycle internal combustion engine including a combustion chamber (3) in which at least two intake lines (31, 32) terminate through ports (21, 22, 23) and an exhaust line (5), each of which can be closed by a means such as a valve (41, 42, 6), at least one ignition means (7; 11), a means (9) for direct injection of fuel into said combustion chamber (3). According to the invention, the intake ports (21, 22) are diametrically opposite each other. In addition, at least one of ignition means (11) has an axis disposed perpendicularly to the outer surface of the fuel jet generated by injection means (9).

11 Claims, 1 Drawing Sheet

CONTROLLED-IGNITION DIRECT FUEL INJECTION FOUR-CYCLE INTERNAL COMBUSTION ENGINE

The present invention relates to the field of four-cycle engines with controlled ignition and direct injection of fuel into the combustion chamber.

In particular, the present invention relates to controlling the internal air dynamics of the combustion chambers of the engines defined above.

Interestingly, the present invention relates to so-called transverse engines, with the exhaust located at the rear of the vehicle and the intake at the front.

An inherent problem in this type of engine is the disassembly of the spark plug and/or the injectors, in particular. Since, in addition, many transverse engines have a cylinder axis inclined toward the rear of the vehicle relative to vertical, hence, on the exhaust side, any removable element must not be placed on the exhaust side but rather toward the front of the hood to make its removal possible and easy.

Most transverse engines have on the intake side, namely toward the front of the vehicle, at least one intake line leading to one cylinder. On the exhaust side (toward the rear of the vehicle), there are at least one exhaust line and the associated ports and valves. The spark plug is preferably located near the cylinder axis, hence in a central position in the combustion chamber. This arrangement allows a homogeneous batch of fuel to be burned with no risk of pinging.

It is also useful to be able to cause controlled-ignition four-cycle engines to operate optimally, whatever the charge conditions.

Attempts have thus been made to have sometimes a homogeneous charge and sometimes a so-called stratified charge, and to be able to switch rapidly from one operating mode to the other. For example, an engine with these characteristics has been described in patent application EN 95/07384 filed in the name of the applicant.

The present invention applies preferentially to this type of engine and allows installation and removal of essential parts such as spark plugs and/or injection means to be improved for transverse engines in particular.

Thus, the invention relates to a controlled-ignition four-cycle internal combustion engine having a combustion chamber in which two intake lines terminate via ports and an exhaust line, each of which can be closed by a means such as a valve, at least one ignition means, and a means for direct injection of fuel into said combustion chamber.

According to the invention, the intake ports are arranged such that they are diametrically opposite one another.

In addition, the engine according to the invention can include a prechamber opening in said combustion chamber into which the injection means terminates, said prechamber being located in a half-cylinder that does not contain the exhaust port and contains one of the intake ports.

According to one of the embodiments of the invention, a first ignition means terminates in said prechamber.

Preferably, at least one of the ignition means has an axis disposed perpendicularly to the outer surface of the fuel jet generated by the injection means.

The half-cylinder containing said prechamber is preferably oriented toward the front of the vehicle.

According to one embodiment of the invention, it has two ignition means.

Thus the first ignition means is located near the lengthwise axis of the cylinder.

In particular, the distance between the tip of the injection means and at least one of the ignition means is between 15 and 30 min.

Advantageously, the injection means is disposed diametrically opposite to the exhaust port.

According to one particular embodiment of the invention, the first intake line, terminating in the same half-cylinder as the exhaust line, can be connected to the exhaust line for certain engine operating conditions.

In accordance with another embodiment of the invention, the intake line has, near the combustion chamber, an axis substantially parallel to the cylinder axis in order to create a swirling movement in said combustion chamber around an axis perpendicular to the cylinder axis.

Other characteristics, details, and advantages of the invention will emerge from the description hereinbelow provided for illustration and not limitation with reference to the enclosed figures wherein:

FIGS. 1 and 2 show schematically the essential component elements of an engine according to one embodiment of the invention.

Figure 1:
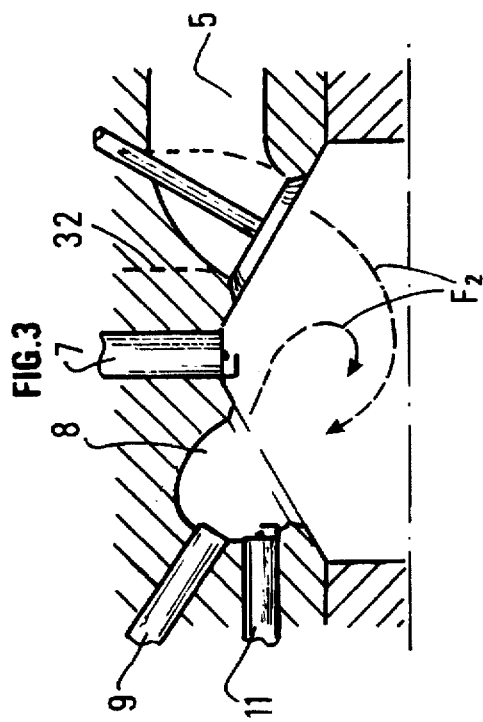
FIG. 1 is a simplified lengthwise section of a first embodiment of the invention.

FIG. 1 shows a piston 1 at top dead center with an upper surface 10 in the form of a double-pitched roof. This profile is also that of the cylinder head 2 in which intake lines 31, 32 terminate via ports 21, 22, each of which is closable by specific means such as valves 41, 42.

Combustion chamber 3 is defined classically by the upper surface area 10 of piston 1, the lower surface area of cylinder head 2, and cylinder 4.

An exhaust line 5 also enters combustion chamber 3 via a port 23 that can be closed by a particular means such as a valve 6.

At least one ignition means such as a spark plug 7 can be disposed as close as possible to the center of the chamber to avoid pinging. Spark plug 7 is preferably placed on (or near) the lengthwise axis of the cylinder, opposite the peak of the double-pitched roof formed by cylinder head 2.

Figure 2:
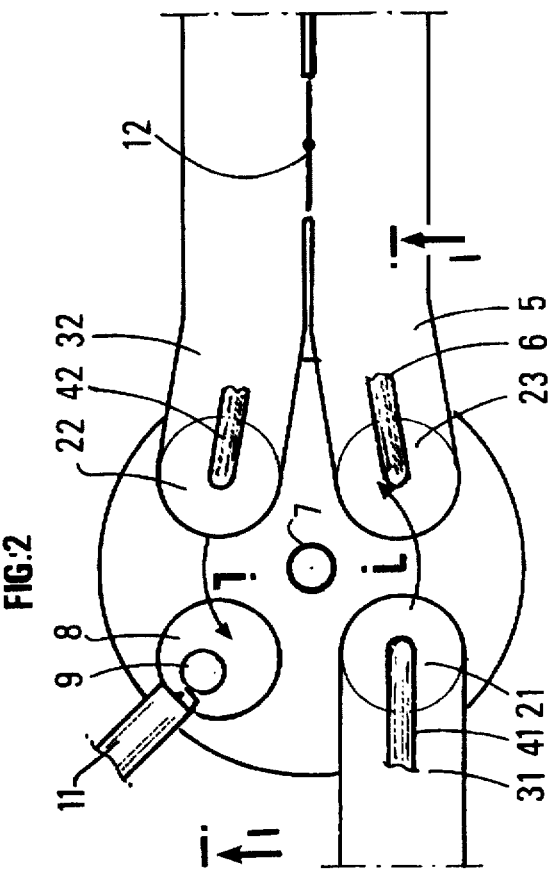
FIG. 2 is a cross section along line A-A of the first embodiment of the invention.

According to the invention, the intake ports 21, 22 are disposed diametrically opposite one another, as can be seen in FIG. 2.

In addition, a prechamber 8, which opens into combustion chamber 3, is provided. Prechamber 8 is located diametrically opposite exhaust port 23. A fuel injection means terminates in prechamber 8.

Thus, prechamber 8 and one of the intakes 21, 31 belong to one half-cylinder while the other intake 23, 5 and the exhaust belong to the other half-cylinder. More specifically, prechamber 8 and one of the intakes 21, 31 belong to the half-cylinder which is oriented toward the front of the vehicle and easily accessible. Similarly the other intake 22, 23 and exhaust 23, 5 belong to the half-cylinder located at the rear of the vehicle, toward the exhaust pipe.

According to one embodiment of the invention, a second spark plug 11 can also be provided; it is preferably disposed in prechamber 8, namely, on the intake side. Thus, spark plug 11 is easy to disassemble.

Also, spark plug 11 has an axis disposed perpendicularly to the outer surface of the jet produced by fuel injection means 9. This arrangement is useful because it affords good stratification of the mix with a highly fuel-rich area near spark plug 11, in prechamber 8.

Spark plug 7, located centrally, is then dedicated to operation with a homogenous charge.

On the exhaust side, intake line 32 and exhaust line 5 are inclined relative to the lengthwise axis of the cylinder. Thus a flow around the lengthwise axis of the cylinder can be created in combustion chamber 3.

In addition, according to this embodiment of the invention, a connection 12 can be provided between intake line 32 and exhaust line 5. It can then form a recirculation circuit for the exhaust gasses which in this case is very short and hence useful in terms of response time (in transient states). Exhaust gas recirculation (EGR) is very easy to achieve since the engine is designed such that one of the intake lines 32 and exhaust line 5 are disposed side by side in the immediate vicinity of each other.

The other advantage of the embodiment that has just been described resides in the arrangement of injection means 9 (and possibly one spark plug 11) on the front side of the hood, thus easy to disassemble.

Figure 3:
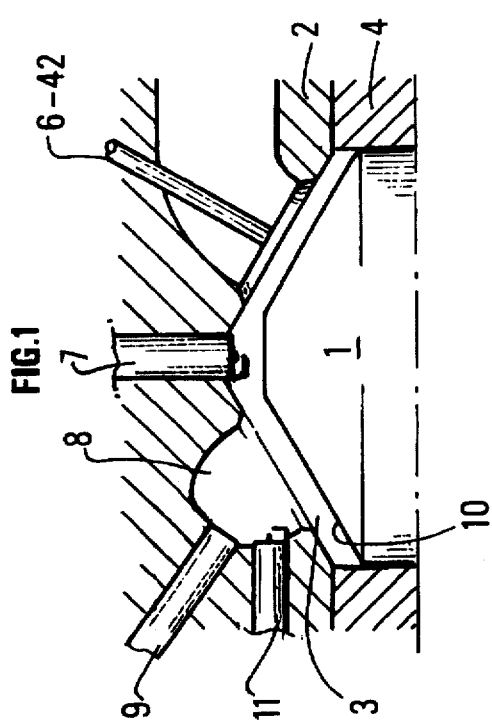
FIG. 3 shows a second embodiment of the invention in simplified lengthwise section.
Figure 4:
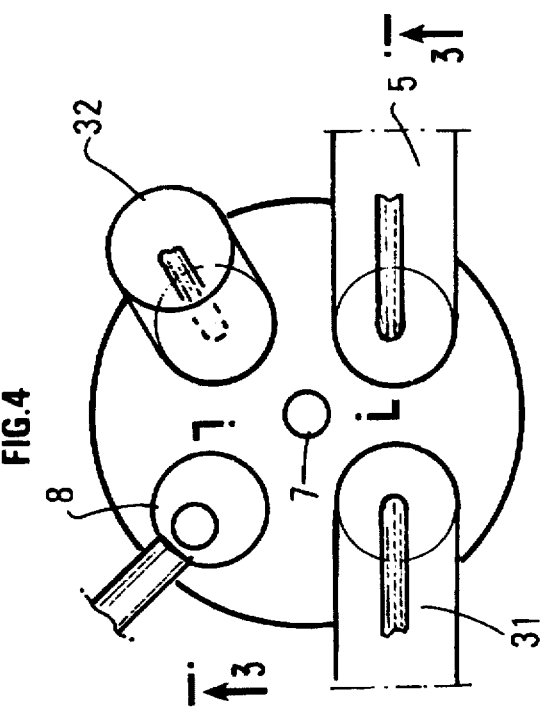
FIG. 4 illustrates the second embodiment of the invention by a cross section along B—B.

FIGS. 3 and 4 illustrate one embodiment of the invention which differs from that of FIGS. 1 and 2 by the orientation of intake line 32 near combustion chamber 3.

Intake line 32 in this case has an axis with only a small inclination relative to the lengthwise axis of the cylinder. Thus, the fluid coming from intake line 32 penetrates essentially lengthwise into the cylinder and is then deflected by the upper surface 10 of piston 1 to prechamber 8.

Because of this, the general movement of the gases in combustion chamber 3 is a rotational movement around an axis essentially perpendicular to the lengthwise axis, as indicated by arrows F2 in FIGS. 3 and 4. This movement is commonly called "tumble" by the individual skilled in the art.

For the embodiments described above, the tip of injection means 9 will be located at a distance of between 15 and 30 mm from the interelectrode gap of spark plug 11 or 7. This distance optimizes ignition with stratified-mode combustion.

Of course, other changes in form may be made by the individual skilled in the art to the engine just described without departing from the framework of the present invention.

I claim:

1. Controlled-ignition direct fuel injection four-cycle internal combustion engine including a combustion chamber (3) in which at least two intake lines (31, 32) terminate via ports (21, 22, 23) and an exhaust line (5), each of which can be closed by a means such as a valve (41, 42, 6), at least one ignition means (7; 11), a means (9) for direction injection of fuel into said combustion chamber (3), characterized in that intake ports (21, 22) are disposed diametrically opposite to each other and in that it also comprises a prechamber (8) opening into said combustion chamber (3) in which injection means (9) terminates, said prechamber (8) being located in the half-cylinder that does not contain exhaust port (23) and contains one of intake ports (21).

2. Engine according to claim 1, characterized in that at least one of the ignition means (11) has an axis disposed perpendicularly to the outer surface of the fuel jet generated by ignition means (9).

3. Engine according to claim 1, characterized in that a first ignition means terminates in said prechamber.

4. Engine according to claims 1, characterized in that the half-cylinder containing said prechamber (8) is oriented toward the front of the vehicle.

5. Engine according to claims 1, characterized in that it includes two ignition means (7, 11).

6. Engine according to claims 5, characterized in that first ignition means (7) is located in the vicinity of the lengthwise axis of the cylinder.

7. Engine according to claim 3, characterized in that the distance between the tip of injection means (9) and one of ignition means (7 or 11) is between 15 and 30 mm.

8. Engine according to claim 3, characterized in that injection means (9) is disposed diametrically opposite exhaust port 23.

9. Engine according to claim 1, characterized in that the first intake line (32) terminating in the same half-cylinder as exhaust line (5) can be made to connect to the exhaust line for certain engine operating conditions.

10. Engine according to claim 9, characterized in that said first intake line (32) has, in the vicinity of combustion chamber (3), an axis essentially perpendicular to the cylinder axis in order to create a swirling movement around the cylinder axis in said combustion chamber (3).

11. Engine according to claim 1, characterized in that intake line (32) has, in the vicinity of combustion chamber (3), an axis essentially perpendicular to the cylinder axis in order to create a swirling movement around the cylinder axis in said combustion chamber (3).

* * * * *